United States Patent [19]

Oike

[11] Patent Number: 4,856,287

[45] Date of Patent: Aug. 15, 1989

[54] TEMPERATURE CONTROLLER AND METHOD OF TEMPERATURE CONTROL FOR USE IN A REFRIGERATING DEVICE

[75] Inventor: Hiroshi Oike, Osaka, Japan

[73] Assignee: Kabushiki Kaisha Toshiba, Kawasaki, Japan

[21] Appl. No.: 165,606

[22] Filed: Mar. 8, 1988

[30] Foreign Application Priority Data

Mar. 13, 1987 [JP] Japan .................. 62-59700

[51] Int. Cl.$^4$ .............................................. F25B 49/00
[52] U.S. Cl. ........................................ 62/126; 62/158; 340/585
[58] Field of Search ................ 62/126, 127, 129, 130, 62/158; 165/11; 340/585; 236/94; 364/557

[56] References Cited

U.S. PATENT DOCUMENTS

| | | |
|---|---|---|
| 4,045,973 | 9/1977 | Anderson et al. .................. 62/158 |
| 4,363,556 | 12/1982 | Belliveau et al. .................. 374/183 |
| 4,381,549 | 4/1983 | Stamp, Jr. et al. ................. 62/126 |
| 4,432,210 | 2/1984 | Saito .................................. 364/557 X |
| 4,490,986 | 1/1985 | Paddock ............................. 62/127 |
| 4,535,598 | 8/1985 | Mount ................................ 62/201 X |

FOREIGN PATENT DOCUMENTS

| | | |
|---|---|---|
| 0064873 | 11/1982 | European Pat. Off. . |
| 56-148579 | 11/1981 | Japan . |
| 1362605 | 2/1972 | United Kingdom . |
| 1556766 | 10/1976 | United Kingdom . |
| 2123581 | 6/1982 | United Kingdom . |
| 2094507 | 9/1982 | United Kingdom . |
| 2100474 | 12/1982 | United Kingdom . |
| 2143057 | 7/1983 | United Kingdom . |
| 2119131 | 11/1983 | United Kingdom . |
| 2130755 | 6/1984 | United Kingdom . |

*Primary Examiner*—Harry B. Tanner
*Attorney, Agent, or Firm*—Cushman, Darby & Cushman

[57] ABSTRACT

A temperature controller and method of controlling temperature for use in a refrigerating device includes a temperature sensor for detecting temperature in a compartment of the refrigerator, a conversion element, a refrigerating cycle driving element, a comparison element, and a memory element. The conversion element converts the temperature detected by the temperature sensor into a voltage value. The refrigerating cycle driving element operates a refrigerating cycle to cool the compartment in accordance with the voltage value. The comparison element compares the voltage value with a predetermined voltage range. This predetermined voltage range is wider than a voltage range corresponding to an ordinary operating temperature range at which the temperature in the compartment is maintained. When the voltage value converted from the temperature detected by the temperature sensor is outside the predetermined voltage range, it is decided that the failure has occurred in the temperature sensor, and the failure of the temperature sensor is memorized in the memory element.

17 Claims, 4 Drawing Sheets

TEMPERATURE CONTROLLER AND METHOD OF TEMPERATURE CONTROL FOR USE IN A REFRIGERATING DEVICE

BACKGROUND OF THE INVENTION

1. FIELD OF THE INVENTION

The present invention relates, in general, to a refrigerating device. More particularly, the invention relates to a temperature controller and method of controlling temperature in a refrigerating device, and is preferably used in conjunction with a refrigerator.

2. DESCRIPTION OF THE PRIOR ART

It is known that a temperature control circuit of a refrigerating device comprises a sensor circuit and a refrigerating cycle control device. The sensor circuit outputs a temperature signal obtained from the voltage division point of a voltage divider circuit comprising a temperature sensor and a resistor. The refrigerating cycle control device drives and stops the refrigerating cycle for cooling an inside, for example, of a refrigerator, respectively, in accordance with the voltage value of the temperature signal.

The temperature sensor, for detecting the internal temperature of the refrigerator, consists of, for example, a thermistor whose resistance value has a negative temperature characteristic. In the voltage divider circuit, D.C. power is connected to the temperature sensor and the resistor connected in series. An example of such a temperature control circuit for a refrigerating device is disclosed in Japanese Utility - Model Laid -Open Publication No. 56-148579, filed on Apr. 7, 1980 in the name of Yasuhiro Ogita.

In Japanese Utility - Model Laid - Open Publication No. 56-148579, the sensor circuit outputs, through a comparator, the temperature signal obtained from the voltage division point of the voltage divider circuit comprising the temperature sensor and the resistor. A microcomputer controls the operation of the refrigerating cycle for cooling the interior of the refrigerator in accordance with the voltage value of the temperature signal.

In general, there is a possibility for the temperature sensor to be subject to failures, such as a disconnection failure or a continuity failure. In the conventional refrigerator temperature control circuit, when a disconnection failure occurs in the temperature sensor, the voltage of the temperature signal becomes 0. Accordingly, the refrigerating cycle control device, such as, e.g., a microcomputer, judges that the temperature inside the refrigerator is extremely low, even though it may in fact be above the set temperature, and therefore does not drive the refrigerating cycle. As a result the temperature inside the refrigerator becomes abnormally high, causing the food stored therein to spoil.

When a continuity failure occurs in the temperature sensor, the voltage of the temperature signal becomes the same high voltage as the D.C. power source. Accordingly, the refrigerating cycle control device judges that the temperature inside the refrigerator is extremely high, even though it may in fact be below the set temperature, and therefore continue to drive the refrigerating cycle. As a result, the temperature inside the refrigerator becomes abnormally low, causing the food stored therein to be frozen.

Besides the permanent failures described above, there could also be intermittent continuity failures due to the effect of moisture inside or outside the refrigerator. In this case, though repair is necessary it is very difficult to accomplish since the intermittent continuity failures may have been rectified temporarily during troubleshooting of the problem.

SUMMARY OF THE INVENTION

It is an object of the present invention to provide a temperature controller and method of controlling temperature in a refrigerating device, which detects a failure in a temperature sensor provided therein.

To accomplish the object described above, the temperature controller includes a conversion element, a refrigerating cycle driving element, a comparison element, and a memory element. In operation, the conversion element converts the temperature detected by the temperature sensor into a voltage value. In accordance with the voltage value, the refrigerating cycle driving element operates a refrigerating cycle to cool a compartment of the refrigerating device.

The comparison element compares the voltage value with a predetermined voltage range which corresponds to an ordinary temperature range in the compartment. When the voltage value is outside the predetermined voltage range, it is decided that the failure has occurred in the temperature sensor, and this failure of the temperature sensor is memorized in the memory element, with the memory element being set to a predetermined value.

BRIEF DESCRIPTION OF THE DRAWINGS

The present invention will be explained in detail with reference to the accompanying drawings.

DETAILED DESCRIPTION OF THE PREFERRED EMBODIMENT

An embodiment of the present invention will be described with reference to the accompanying drawings.

Figure 1:
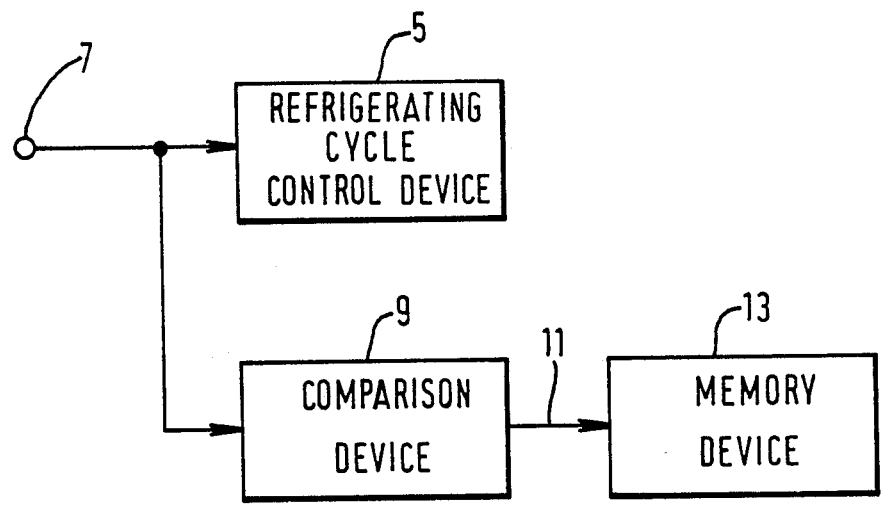
FIG. 1 is a block diagram of the present invention.

As is shown in FIG. 1, refrigerating cycle control device 5, which is similar to the conventional construction, receives temperature signal 7 from a refrigerator, for example, temperature sensor (not shown). Comparison device 9 outputs comparison signal 11 when the voltage value of temperature signal 7 is outside a voltage range, which is set wider than the voltage range for the ordinary running of the refrigerator. Memory device 13 stores comparison signal 11 from comparison device 9.

When there is a disconnection or continuity failure in the temperature sensor, the voltage of temperature signal 7, whether the failure is permanent or not, falls outside of the set voltage range. Consequently this failure of the temperature sensor is detected by comparison device 9, and comparison signal 11 is output therefrom. Memory device 13 stores this comparison signal 11. If the failure of the temperature sensor is intermittent and the temperature sensor has reverted to the normal state by itself, comparison signal 11 is no longer output, but memory device 13 retains the memory of comparison signal 11 as before.

Figure 2:
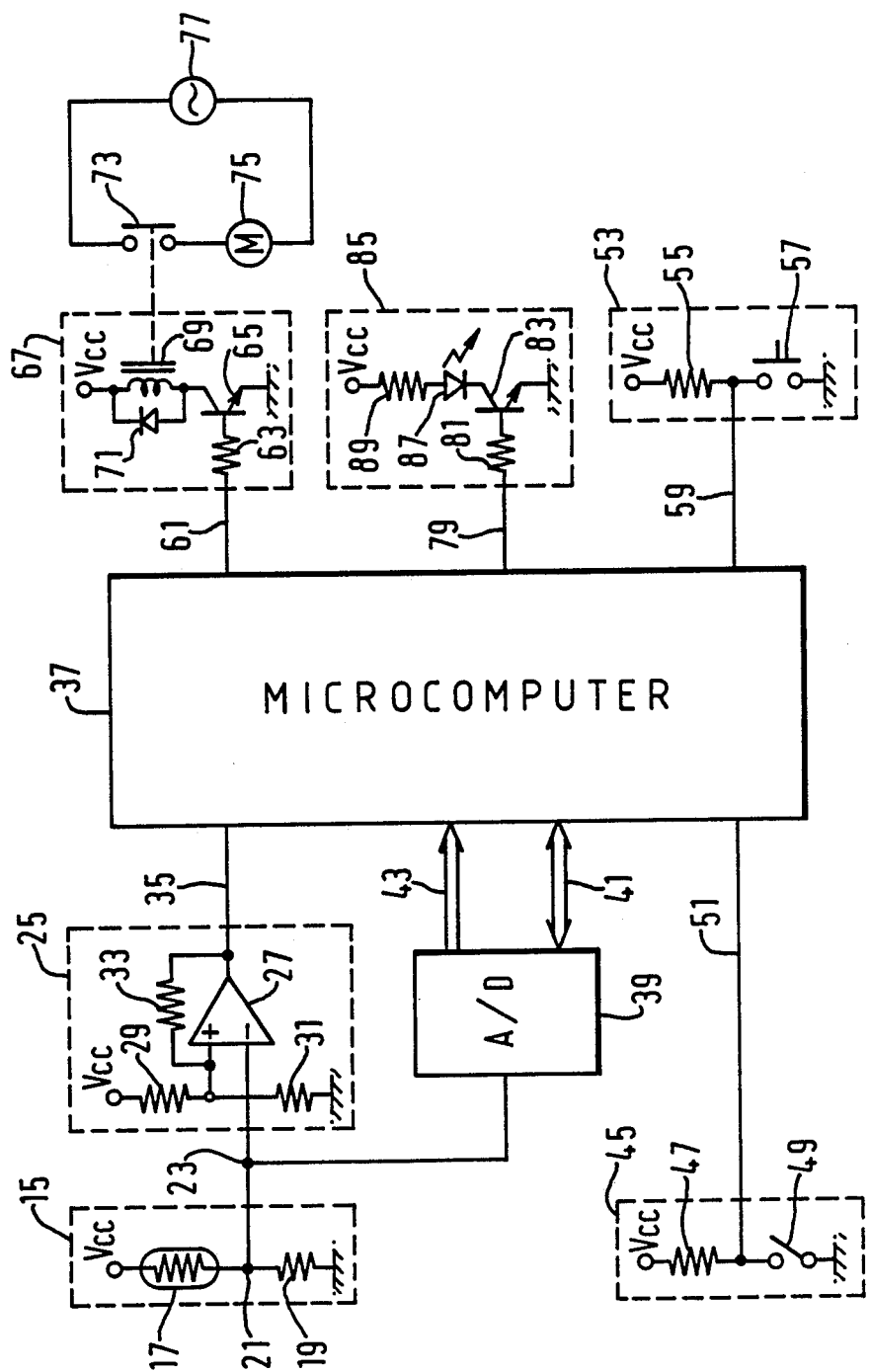
FIG. 2 is a schematic circuit diagram of the present invention.

A refrigerator control circuit embodying the above described components will now be described. As shown in FIG. 2, in sensor circuit 15, one end of temperature sensor 17 and one end of resistor 19 are connected at connection point 21. Temperature sensor 17 consists of, for example, a thermistor having a negative temperature characteristic. The other end of temperature sensor 17 is connected to a D.C. power source Vcc, and the other end of resistor 19 is connected to ground. The voltage of connection point 21 is output from sensor circuit 15 as temperature signal 23.

In temperature detection circuit 25, temperature signal 23 is input into an inverting input terminal (−) of comparator 27. A non-inverting input terminal (+) of comparator 27 is connected via resistor 29 and resistor 31 to the D.C. power source Vcc and ground, respectively. The non-inverting input terminal (+) of comparator 27 is also connected to the output terminal thereof via feed-back resistor 33. The comparator 27 outputs temperature detection signal 35 from temperature detection circuit 25 to microcomputer 37.

Microcomputer 37 is a single-chip microcomputer incorporating a memory, timers and I/O ports. A/D converter 39 receives temperature signal 23 at the analog input terminal thereof. A/D converter carries out A/D conversion by exchanging A/D control signal 41 with microcomputer 37, and outputs the result of the A/D conversion to microcomputer 37 in the form of data signal 43.

Switching circuit 45 is constructed such that D.C. power source Vcc is connected to ground through a resistor 47 and a holding contact 49 in series. The voltage at the connection point of resistor 47 and holding contact 49 is input to microcomputer 37 as switching signal 51, to select a display mode of the temperature sensor failures.

Reset circuit 53 resets the memory of the temperature sensor failure stored in microcomputer 37. Reset circuit 53 is constructed such that D.C. power source Vcc is connected to ground through resistor 55 and manually-operated automatic-reset contact 57 in series. The voltage at the connection point of resistor 55 and contact 57 is input to microcomputer 37 as reset signal 59.

Compressor control signal 61 output from microcomputer 37 is input through resistor 63 into the base of NPN transistor 65, in compressor control circuit 67. The emitter of the NPN transistor 65 is connected to ground, while the collector thereof is connected to D.C. power source Vcc through coil 69 of a relay. Diode 71 is connected to both ends of coil 69, with the cathode connected to D.C. power source Vcc side of coil 69. Contact 73 of the relay, with coil 69, is connected in series with compressor motor 75. A.C. power source 77 is connected across the series connection of contact 73 and compressor motor 75.

Display signal 79, output from microcomputer 37, is input through resistor 81 into the base of NPN transistor 83, in display circuit 85. The emitter of NPN transistor 83 is connected to ground, while the collector thereof is connected to the cathode of light-emitting diode 87. The anode of light-emitting diode 87 is connected to D.C. power source Vcc through resistor 89.

Figure 3:
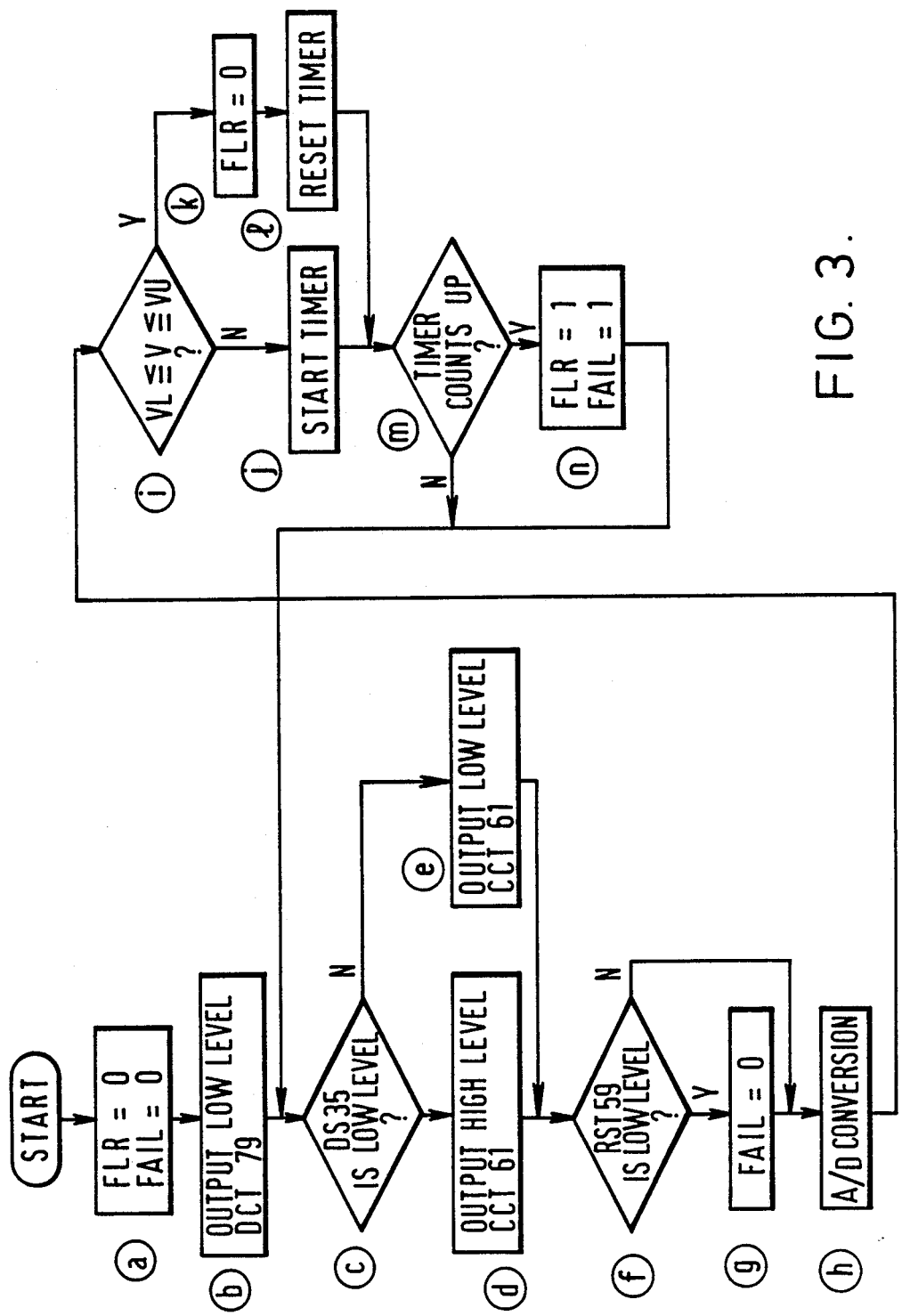
FIGS. 3 and 4 are flow charts illustrating the method of operation of the present invention.
Figure 4:
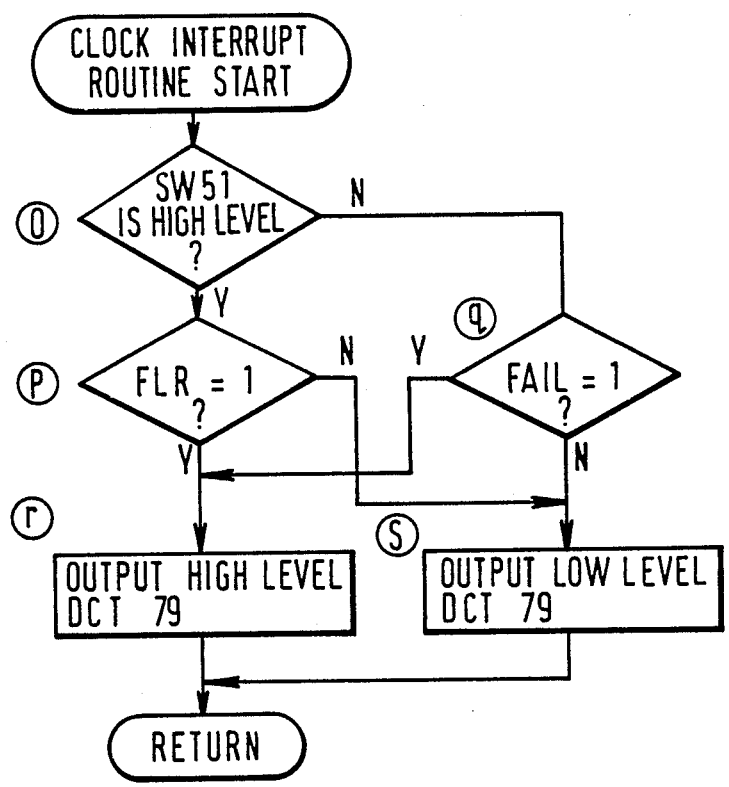

FIGS. 3 and 4 illustrate the operation of microcomputer 37, as will now be described. In step a, the contents of the memory addresses in the memory of microcomputer 37 for remembering failures of temperature sensor 17, i.e., failure memories FLR and FAIL, are set to O. In step b, low level display signal (DCT) 79 is output from microcomputer 37 to display circuit 85. Upon receiving low level display signal (DCT) 79, NPN transistor 83 turns OFF and light-emitting diode 87 is extinguished, in display circuit 85.

In step c, the voltage level of temperature detection signal (DS) 35 is checked. Temperature detection signal (DS) 35, which is output from temperature detection circuit 25, is normally at a low level when the temperature inside the refrigerator is above a set temperature, and is at a high level when the temperature therein is below the set temperature.

The voltage of the non-inverting input terminal (+) of comparator 27 is the set voltage determined by the voltage value of D.C. power source Vcc and the resistance value of resistors 29 and 31, and hysteresis is provided by positive feedback by the use of feed-back resistor 33. The upper limit of the set voltage is VSV, and the lower limit thereof is VSL.

Further, since the resistance value of temperature sensor 17 has a negative temperature characteristic, the voltage V, i.e., the voltage of the inverting input terminal of comparator 27, increases as the temperature inside the refrigerator rises. Consequently, when the temperature inside the refrigerator rises and the voltage V of the inverting input terminal of comparator 27 rises above the upper limit VSV of the set voltage, the output of comparator 27, i.e., the temperature detection signal (TDS) 35 goes to a low level.

On the other hand, when the temperature inside the refrigerator falls and the voltage V of the inverting input terminal of comparator 27 falls lower than the lower limit VSL of the set voltage, the output of comparator 27, i.e., the temperature detection signal (TDS) 35, goes to a high level.

When the YES-path is taken in step c, microcomputer 37 executes step d. When the NO-path is taken in step c, microcomputer 37 executes step e. In step d, high level compressor control signal (CCT) 61 is output from microcomputer 37 to compressor control circuit 67. Consequently, NPN transistor 65 turns ON, a direct current passes through the coil 69 and contact 73 is closed. Accordingly, compressor motor 75 is driven by A.C. power supply 77, the refrigerating cycle is started, and the inside of the refrigerator is cooled.

In step e, low level compressor control signal (CCT) 61 is output from microcomputer 37 to compressor control circuit 67. Consequently, NPN transistor 65 turns OFF, coil 69 is deenergized and contact 73 is opened. Accordingly, compressor motor 75 is stopped and the cooling of the inside of the refrigerator is halted.

In step f, the voltage level of reset signal (RST) 59 is checked. Reset signal (RST) 59 becomes a low level only when contact 57 in reset circuit 53 is closed. When the NO-path is taken in step f, microcomputer 37 executes step h without executing step g. In step g, the failure memory FAIL is set to 0.

In step h, the voltage V of temperature signal 23, converted by A/D converter 39 to a digital value, is input to microcomputer 37 as data signal 43. This process is performed under the control of A/D control signals 41, i.e., a start conversion request signal and a conversion termination signal, which are exchanged between microcomputer 37 and A/D convertor 39.

In step i, the decision is made as to whether or not the digital voltage value of temperature signal 23 is between normal upper limit voltage VU and the normal lower limit voltage VL. The normal upper limit voltage VU is set higher than the previously-mentioned set upper limit VSU and lower than Vcc, while normal lower limit voltage VL is set at a positive value lower than the previously-mentioned set lower limit VSL. In other words, the voltage range between normal upper voltage limit VU and normal lower voltage limit VL is wider than the voltage range VSU-VSL, for the ordinary working of the refrigerator.

When a failure such as one of those mentioned earlier i.e., disconnection failure or continuity failure, develops in temperature sensor 17, the voltage value V of temperature signal 23 becomes 0 or Vcc. Therefore, the voltage value V of temperature signal 23 no longer falls between normal upper limit voltage VU and normal lower limit voltage VL, and thus the NO-path is taken in step i. When the N0-path is taken to step j, a timer is activated which counts a predetermined time, for example one minute, ten minutes, or one hour.

On the other hand, when there is no failure in temperature sensor 17, the voltage value V of temperature signal 23 is between normal upper limit voltage VU and the normal lower limit voltage VL. Accordingly, the YES-path is taken in step i. When the YES-path is taken to step k, the failure memory FLR is reset to 0, and in step 1 the time count of the above-mentioned timer is reset.

In step m, judgement is made whether or not the timer which started time-counting in step j has come to the end of its count, i.e., whether or not the failure in temperature sensor 17 has continued for a predetermined time. When the failure therein has not continued for this period of time, the NO-path is taken, and microcomputer 37 executes step c. When the failure therein has continued for this period of time, the YES-path is taken. When the YES-path is taken, microcomputer 37 executes step n, and then executes step c.

In step n, the failure memories FLR and FAIL are set to 1, thereby making the judgement that there is definitely a failure in temperature sensor 17. Since the failure memories FLR and FAIL are set only when the failure in temperature sensor 17 has continued for a predetermined period, spurious failure detection is prevented. The failure memory FLR is reset to 0 in step k, when the failure has recovered, even though it had been set to 1 in step n when the failure was detected. The failure memory FAIL, however, remains set to 1 until contact 57 in reset circuit 53 is closed.

Another timer in microcomputer 37 generates a clock interrupt signal, e.g., every one second. The routine shown in FIG. 4 is executed each time this clock interrupt signal is generated. The routine shown in FIG. 4 is for displaying failures in temperature sensor 17, which were detected and memorized as described above.

In step o, the voltage level of switching signal (SW) 51 is checked. In switching circuit 45, switching signal (SW) 51 becomes a high level when holding contact 49 is open, and becomes a low level when holding contact 49 is closed. When holding contact 49 is open, and switching signal (SW) 51 is at a high level, the YES-path is taken. When the YES-path is taken, step p is executed. When holding contact 49 is closed, and switching signal (SW) 51 is at a low level, the NO-path is taken. When the NO-path is taken, step q is executed.

In step p, the content of failure memory FLR is checked. When the content of the FLR memory is 1, the YES-path is taken and step r is executed. When the content of the FLR memory is 0, the NO-path is taken and step s is executed.

In step q, which is reached when switching signal 51 is determined to be at a low level in step o, the content of failure memory FAIL, which is reset to 0 only when the contact 57 in the reset circuit 53 is closed once it has been set to 1, is checked. When the content of the FAIL memory is 1, the YES-path is taken and step r is executed. When the content of the FAIL memory is 0, the NO-path is taken and step s is executed.

In step r, high level display signal (DCT) 79 is output from microcomputer 37 to display circuit 85. Upon receiving high level display signal (DCT) 79, NPN transistor 83 turns ON, D.C. current is supplied through resistor 89 to light-emitting diode 87 which lights up, displaying that a failure has occurred in temperature sensor 17.

In step s, low level display signal (DCT) 79 is output from microcomputer 37 to display circuit 85. Upon receiving low level display signal (DCT) 79, NPN transistor 83 turns OFF and light-emitting diode 87 goes out. After having executed step r or step s, the operation of microcomputer 37 returns to operation in accordance with the flow chart of FIG. 3.

Light-emitting diode 87 in display circuit 85 turns ON and OFF in accordance with the content of memory FLR and the status of content 49 in switching circuit 45. Therefore, if light-emitting diode 87 does not light up either when holding contact 49 is closed or when it is open, it is shown that no failure has developed in temperature sensor 17. Further, if light-emitting diode 87 lights up in either case, it is shown that a permanent failure has developed in temperature sensor 17. In addition, if light-emitting diode 87 lights up when holding contact 49 is closed, but goes out when holding contact 49 is opened, it is shown that an intermittent failure has developed in temperature sensor 17. Accordingly, the invention embodiment not only establishes whether the failure has occurred in temperature sensor 17, but also discriminates whether the failure is permanent or intermittent, and thus provides a clue to the cause of the failure when maintenance is carried out.

As can be understood from the above-described embodiment of the invention, since the voltage value of temperature signal 23 is checked whether or not it is within the voltage range which is wider than the voltage range for ordinary running of the refrigerator, disconnection or continuity failures in temperature sensor 17 can be detected irrespective of whether or not the failures are permanent or intermittent. Further, since the failures in temperature sensor 17 are memorized, even if the failures are intermittent and are subsequently recovered, it can be easily discovered that a failure has occurred in temperature sensor 17.

The present invention has been described with respect to a specific embodiment. However, other embodiments based on the principles of the present invention should be obvious to those of ordinary skill in the art. For example, a comparator such as that employed in temperature detection circuit 25 may be adopted for use instead of A/D converter 39. A flip-flop gate may be adopted as a memory device. Such embodiments are also intended to be covered by the claims.

What is claimed is:

1. A temperature controller including a temperature sensor for use in a refrigerating device, said temperature controller comprising:
    conversion means for converting a temperature detected by the temperature sensor into a voltage value;
    refrigerating cycle driving means, connected to receive the voltage value, for operating a refrigerating cycle to cool a compartment in accordance with the voltage value;

comparison means for comparing the voltage value with a predetermined voltage range wider than a voltage range corresponding to an ordinary operating temperature range in the compartment; and memory means for storing a predetermined value when said comparison means determines that the voltage value is maintained outside the predetermined voltage range for a certain period of time, and for resetting said predetermined value when said voltage value is maintained inside the predetermined voltage range for a time shorter than said certain period of time.

2. A temperature controller according to claim 1, further comprising display means for displaying the predetermined value stored in said memory means.

3. A temperature controller according to claim 2, said comparison means including an A/D converter.

4. A temperature controller according to claim 1, said memory means further storing a second value which is set to the predetermined value when the voltage value corresponding to the temperature detected by said temperature sensor is outside the predetermined voltage range for said predetermined period, and is not reset when the voltage value is inside the predetermined voltage range.

5. A temperature controller according to claim 4, said display means including a switching element to select which value is indicated thereby.

6. A temperature controller according to claim 2, said comparison means including a timer means for counting said certain time period for which the voltage value corresponding to the temperature detected by said temperature sensor is outside the predetermined voltage range, the memory means being set to the predetermined value when the timer means completes counting the time period and said voltage value is still outside the predetermined range.

7. A temperature controller according to claim 4 further comprising a reset circuit for resetting said second value.

8. A temperature controller for use in a refrigerating device, said temperature controller comprising:

a temperature sensor for detecting a temperature in a compartment;

conversion means for converting the temperature detected by said temperature sensor into a voltage value indicative thereof;

refrigerating cycle driving means, coupled to receive said voltage value, for operating a refrigerating cycle to cool the compartment in accordance with the voltage value;

comparison means for comparing the voltage value with a predetermined voltage range wider than a voltage range corresponding to an ordinary operating temperature range in the compartment; and memory means for storing a predetermined value when said comparison means determines that the voltage value is outside the predetermined voltage range for a certain period; and processing means for resetting said predetermined value when said comparison means determines that the voltage value is within the predetermined voltage range, for a time shorter than the certain period.

9. A temperature controller according to claim 8, further comprising display means for displaying the predetermined value stored in said memory means.

10. A temperature controller according to claim 9, said comparison means including an A/D convertor.

11. A temperature controller according to claim 8, said memory means further storing a second value when the voltage value corresponding to the temperature detected by said temperature sensor is outside the predetermined voltage range, and which is not reset by said processing means when the voltage value is inside the predetermined voltage range.

12. A temperature controller according to claim 11, said display means including a switching element to select which value will be indicated thereby.

13. A temperature controller according to claim 8, said comparison means including a timer means for counting said certain period for which the voltage value corresponding to the temperature detected by said temperature sensor is outside the predetermined voltage range, the memory means storing the predetermined value when the timer means completes counting the time period and said voltage value is still outside the predetermined range.

14. A temperature controller according to claim 11 further comprising a reset circuit for resetting said second value.

15. A temperature controller according to claim 14 wherein said reset circuit includes a switch to manually reset said value.

16. A method for detecting a failure of a temperature sensor provided in a refrigerator, comprising the steps of:

converting a temperature detected by the temperature sensor into a voltage value;

comparing the voltage value with a predetermined voltage ranger wider than a voltage range corresponding to an ordinary operating temperature range for the refrigerator;

determining that a failure has occurred in the temperature sensor when the voltage value is outside the predetermined voltage range;

memorizing the failure of the temperature sensor after said failure is determined for a certain period of time; and resetting said memorized failure when said voltage value returns to said predetermined range after a time shorter than said certain time.

17. A method for detecting a failure of a temperature sensor provided in a refrigerator, comprising the steps of:

converting a temperature detected by the temperature sensor into a voltage value;

comparing the voltage value with a predetermined voltage range wider than a voltage range corresponding to an ordinary operating temperature range for the refrigerator;

determining that a failure has occurred in the temperature sensor when the voltage value is outside the predetermined voltage range;

memorizing a failure of the temperature sensor when said failure is determined for a certain time;

displaying the failure of the temperature sensor; and resetting said memorized failure when said voltage value is inside the predetermined voltage range for a short period, shorter than said certain time.

* * * * *